(12) United States Patent
Peng et al.

(10) Patent No.: US 12,363,002 B2
(45) Date of Patent: Jul. 15, 2025

(54) INTERIOR GATEWAY PROTOCOL FLOODING OPTIMIZATION METHOD AND DEVICE, AND STORAGE MEDIUM

(71) Applicant: NANJING ZHONGXING SOFTWARE CO, LTD., Jiangsu (CN)

(72) Inventors: Shaofu Peng, Jiangsu (CN); Huilai Wang, Jiangsu (CN); Jinsong Sun, Jiangsu (CN); Huanan Chen, Jiangsu (CN); Yongqing Zhu, Jiangsu (CN)

(73) Assignee: NANJING ZHONGXING SOFTWARE CO., LTD., Jiangsu (CN)

( * ) Notice: Subject to any disclaimer, the term of this patent is extended or adjusted under 35 U.S.C. 154(b) by 423 days.

(21) Appl. No.: 17/633,620

(22) PCT Filed: Jun. 29, 2020

(86) PCT No.: PCT/CN2020/099018
§ 371 (c)(1),
(2) Date: Feb. 8, 2022

(87) PCT Pub. No.: WO2021/022945
PCT Pub. Date: Feb. 11, 2021

(65) Prior Publication Data
US 2022/0321461 A1 Oct. 6, 2022

(30) Foreign Application Priority Data
Aug. 8, 2019 (CN) .......................... 201910730287.6

(51) Int. Cl.
*H04L 41/12* (2022.01)
*H04L 41/0894* (2022.01)
(Continued)

(52) U.S. Cl.
CPC .............. *H04L 41/12* (2013.01); *H04L 45/03* (2022.05); *H04L 45/32* (2013.01); *H04L 41/0894* (2022.05)

(58) Field of Classification Search
None
See application file for complete search history.

(56) References Cited

U.S. PATENT DOCUMENTS 8,009,591 B2 * 8/2011 Retana .................... H04L 12/66
370/255
8,068,411 B2 11/2011 Vasseur et al.
(Continued)

FOREIGN PATENT DOCUMENTS

CN 1859375 A 11/2006
CN 101431448 A 5/2009
(Continued)

OTHER PUBLICATIONS

International Search Report Search Report for corresponding application PCT/CN2020/099018 filed Jun. 29, 2020; Mail date Sep. 28, 2020.
(Continued)

*Primary Examiner* — Peter Chen
*Assistant Examiner* — Jia Hao Deng
(74) *Attorney, Agent, or Firm* — CANTOR COLBURN LLP (57) ABSTRACT

Provided are an interior gateway protocol flooding optimization method and device, and a storage medium. The method for optimizing flooding of an internal gateway protocol comprises: flooding, by a first node, a first packet carrying link state data and first record information to at least one neighboring node, wherein the first record information comprises indication information of nodes that the link state data has passed through. In this embodiment, by carrying
(Continued)

indication information of a node that link state data passes through, it is convenient for the node to reduce redundant sending of link state information according to the information, thereby accelerating convergence speed.

18 Claims, 4 Drawing Sheets

(51) Int. Cl.
  *H04L 45/00* (2022.01)
  *H04L 45/03* (2022.01)
  *H04L 45/16* (2022.01)
  *H04L 49/1515* (2022.01)

(56) References Cited

U.S. PATENT DOCUMENTS 10,404,482 B2 * 9/2019 Wijnands .............. H04L 45/16
2018/0278527 A1 9/2018 Pfister

FOREIGN PATENT DOCUMENTS

| CN | 103118362 A | 5/2013 |
| CN | 103532922 A | 1/2014 |
| CN | 106572016 A | 4/2017 |
| EP | 3361683 A1 | 8/2018 |
| WO | 2019137118 A1 | 7/2019 |

OTHER PUBLICATIONS

Jiang, Xuehui et al., "Improving IGP Convergence through OSPF in Scalable Router", 2009 11th IEE International Conference on High Performance Computing and Communications, Jun. 27, 2009.

European Search Report for corresponding application EP20849979; Mail date Sep. 2, 2022.

T. Bheemarjuna Reddy, "Quality of Service provisioning in ad hoc wireless networks: a survey of issues and solutions", Ad Hoc Networks, Elsevier, Amsterdam, NL. vol. 4, No. 1, Jan. 2, 2006, pp. 83-124.

Candian Office Action for corresponding application 3,147,310; Mail date Dec. 17, 2024.

* cited by examiner

INTERIOR GATEWAY PROTOCOL FLOODING OPTIMIZATION METHOD AND DEVICE, AND STORAGE MEDIUM

TECHNICAL FIELD

Embodiments of the present disclosure relate to, but are not limited to, an interior gateway protocol flooding optimization method and device, and a storage medium.

BACKGROUND

In recent years, the industry is increasingly focusing on the dynamic routing problem of the network topology of the data center Spine-leaf, Clos, and Fat-tree. Traditional IGP (Interior Gateway Protocol) protocols, such as ISIS (Intermediate System to Intermediate System) or OSPF (Open Shortest Path First), flood information to all link redundancy in such a dense network topology, which will cause a heavy burden on a control plane, thereby creating a series of problems. The main problem is to respond to a change in a network topology. A link state routing protocol relies on a certain flooding algorithm. In dense topologies, the flooding algorithm is highly redundant, and each node in the topology will receive the same link state update multiple times from each link. Although all redundant updates will be discarded finally, all the redundant updates have reached a control plane and have been processed. These redundant packets may be arranged before a certain important link state update, so that convergence becomes slow. In addition, in the specific implementation of a network device, the size of an inbound packet queue related to a control plane is limited; if the rate of receiving flooding update within a long period of time exceeds the rate of processing update of a protocol, subsequent update will be discarded, and the discarded update may contain a very important update, so that the stability of a link state database is further delayed, and convergence becomes slow.

SUMMARY

At least one embodiment of the present disclosure provides an internal gateway protocol flooding optimization method and device, and a storage medium, so as to reduce redundant flooding and improve a speed of network convergence.

At least one embodiment of the present disclosure provides a method for optimizing flooding of an internal gateway protocol, comprising:

The first node floods a first packet carrying link state data and first record information to at least one neighboring node, where the first record information comprises indication information of nodes that the link state data has passed through.

At least one embodiment of the present disclosure provides an internal gateway protocol flooding optimization device. The device comprises a memory and a processor. The memory stores a program. When the program is read and executed by the processor, the method for optimizing flooding of an internal gateway protocol according to according to any embodiment is implemented.

At least one embodiment of the present disclosure provides a computer readable storage medium. The computer readable storage medium stores one or more programs. The one or more programs are able to be executed by one or more processors, so as to implement the internal gateway protocol flooding optimization method according to any embodiment.

Compared with the related art, an embodiment of the present disclosure provides a method for optimizing flooding of an internal gateway protocol, comprising: a first node floods a first packet carrying link state data and first record information to at least one neighbouring node, wherein the first record information comprises indication information of nodes that the link state data has passed through. By means of the method of the embodiments of the present disclosure, by indication information carrying about a node that link state data has passed through, it is convenient for the node to reduce redundant sending of the link state information according to the indication information, thereby accelerating convergence speed, achieving extremely simple implementation and very small costs, and having obvious advantages compared with other optimization means.

Additional features and advantages of the disclosure will be set forth in the following description, and the part of additional features and advantages of the disclosure will be obvious from the description, or may be learned by practice of the disclosure. Objects and other advantages of this disclosure may be realized and attained by the structure particularly pointed out in the specification, claims, and drawings.

BRIEF DESCRIPTION OF THE DRAWINGS

The accompanying drawings are used for providing a further understanding of the technical solutions of the present disclosure, constituting a part of the description, and are used for explaining the technical solutions of the present disclosure together with the embodiments of the present disclosure, but do not constitute a limitation to the technical solutions of the present disclosure.

DETAILED DESCRIPTION OF THE EMBODIMENTS

In order to make the objects, technical solutions and advantages of the present disclosure more apparent, the embodiments of the present disclosure will be described hereinafter in detail with reference to the drawings. It is important to note that the embodiments in the present disclosure and characteristics in the embodiments can be combined arbitrarily without conflicts.

Steps shown in the flowchart of the figures are able to be performed in a computer system such as a set of computer executable instructions. Furthermore, although a logic sequence is shown in the flowchart, in some cases, the shown or described steps are able to be executed in a sequence different from that the flowchart described above.

RFC8279 defines BIER (Bit Indexed Explicit Replication) architecture, which is a new architecture for forwarding a multicast data packet, and provides optimal path forwarding for the multicast data packet in a multicast domain. The multicast distribution tree does not need to be established by using a protocol, and the intermediate nodes do not need to maintain any stream state. When a multicast packet arrives at a BFIR (Bit-Forwarding Ingress Router) from outside the domain, the BFIR first determines in which BIER SD (sub-domainn) the packet is to be sent and to which BFER (Bit-Forwarding Egress Router). RFC8296 defines an encapsulation format of a BIER packet. The BFIR inserts "BIER header" into a packet header, in which a BitString is contained, and each bit of the BitString represents a BFR-id (Bit-Forwarding Router-id) of a corresponding BFER. The number of BFERs to which a packet can be forwarded depends on BSL (BitString Length). It is possible that the number of BFRs included in the sub-domain exceeds BSL, and in order to support this situation, SI (Set Identifier) is further introduced into the BLER header. The SI and the BitString together determine the BFERs to which the packet is to be forwarded. If S1 is n and the Kth bit in BitString is 1 (the lowest bit is 1), the packet is sent to a BFER with a BFR-id of n*BSL+K.

RFC8279 also describes a hierarchical model of a BIER architecture. A routing layer at a bottom layer generally establishes unicast route forwarding information by an IGP, and definitely, in a few cases, the unicast route forwarding information may also be established in other manners such as BGP (Border Gateway Protocol) or static route; a BIER layer in an intermediate layer, comprising a protocol and a flow for transmitting a multicast data packet in a BIER domain; a service multicast stream layer located at an upper layer, comprising a multicast service protocol set; a function of a BFIR determining a BFER set for a multicast data packet; and a function of how a BFER further forwards a packet when receiving a packet encapsulated by the BIER from a BIER domain. It can be seen from the described hierarchical model that the forwarding of the BIER packet will generally depend on the forwarding of the underlying IGP unicast route.

In at least one embodiment of the present disclosure, a mechanism for introducing a BIER technology into a dense network topology to solve and optimize a link state data redundancy flooding problem of an IGP protocol is provided.

In at least one embodiment of the present disclosure, a BIER technology is introduced into a dense network topology, and a BIER-based link state data flooding mechanism is provided, so as to reduce redundant flooding of link state data of an IGP protocol, and improve a speed of network convergence.

Figure 1:
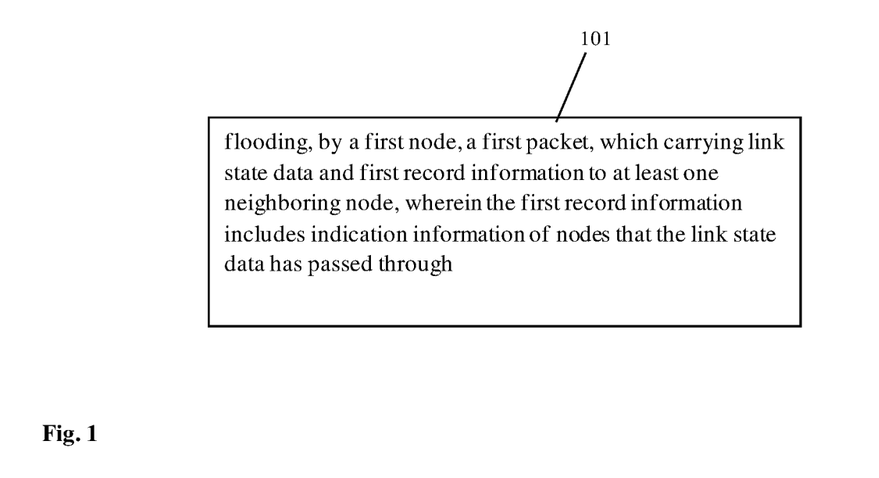
FIG. 1 is a flowchart of an interior gateway protocol flooding optimization method according to an embodiment of the present disclosure.

An embodiment of the present disclosure provides an interior gateway protocol flooding optimization method, as shown in FIG. 1, comprising:

Step 101, a first node floods a first packet carrying link state data and first record information to at least one neighboring node, where the first record information comprises indication information of nodes that the link state data has passed through.

By means of the method of the embodiments of the present disclosure, by indication information carrying about a node that link state data has passed through, it is convenient for the node to reduce redundant sending of the link state information according to the information, thereby accelerating convergence speed, achieving extremely simple implementation and very small costs, and having obvious advantages compared with other optimization means.

In an embodiment, for example, the indication information of the node is, a node identifier. The node identifier may be various identifiers, such as a BFR-id and a physical identifier of the node.

The flooding, by the first node, the link state data may be caused by locally generated link state data, and may also be caused by receiving link state data of another node.

In one embodiment, if the link state data is generated locally by the first node, nodes traversed by the link state data include the first node and all neighboring nodes of the first node;

if the link state data is received by the first node from another node, and the second record information is also received when the link state data is received, the node that the link state data has passed through comprises not only the first node and all the neighboring nodes of the first node, but also the node indicated in the received second record information. It should be noted that the first node, all neighbor nodes of the first node, and the nodes indicated in the second record information may overlap, and when being carried, only one same node is reserved.

In one embodiment, flooding, by a first node, a first packet carrying link state data and first record information to at least one neighboring node comprises:

When the first node locally generates the link state data, flooding, by the first node, the first packet to at least one neighboring node; the first record information comprises an identifier of the first node and identifiers of all neighboring nodes of the first node. That is, the link state data is generated and flooded by the first node.

In one embodiment, the flooding, by a first node, a first packet carrying link state data and first record information to at least one neighboring node comprises:

When the first node receives a second packet carrying second record information and the link state data from a second node, and the link state data does not exist locally or the link state data is newer than local link state data, the first node floods the first packet to a neighboring node other than the second node and nodes indicated by the second record information, wherein the first record information comprises an identifier of the first node, identifiers of all neighboring nodes of the first node, and the second record information. According to the solution provided in this embodiment, link state information is sent to a node whose link state information does not experience according to a carried node, thereby greatly reducing the number of sent packets and improving the convergence speed.

In one embodiment, a capability switch for supporting flooding optimization can be provided. Each node in a network can enable or disable the capability switch. When enabled, sending and receiving packets carrying link state data and record information are supported. When disabled, link state data flooding is realized based on the related art. In addition, when a node does not have the capability switch, the processing is the same as that of the node that disabled the capability switch. Specifically, when the switch of the first node is enabled, the first node sends, to a neighboring node enabling the switch, a first packet carrying link state data and first record information; and for other neighboring nodes disabling the switch, link state data flooding is performed according to a solution in the related art. It should be noted that, the first node comprises, in the first record information carried in the packet sent to the neighbor node that enables the capability switch, indication information of a neighbor node that does not enable or support the flooding optimization capability. In addition, in other embodiments, the capability switch may not be set, and all nodes are defaulted to support receiving and sending the packet carrying the link state data and the first record information, or the capability switch enabling all nodes is forcibly configured.

In one embodiment, the flooding, by a first node, a first packet carrying link state data and first record information to at least one neighboring node comprises:

When the first node supports the preset flooding optimization capability, the first node floods a first packet carrying link state data and first record information to a neighboring node that supports the preset flooding optimization capability.

In an embodiment, the first record information further includes indication information of a node that the link state data can not pass through, and the node that the link state data can not pass through is configured according to a preset policy. The preset policy may be configured as required, for example, the preset policy may be configured according to a network structure. In an embodiment, when the first node is a node in a hierarchical network architecture, a node that the link state data can not pass through comprises another node located in a same layer as the first node, the hierarchical network architecture includes multiple layers of nodes, nodes in a same layer are not connected or only partially connected, and the nodes are fully connected to nodes in a next layer. For example, the hierarchical network architecture is a network architecture such as Spine-leaf, CLOS, and Fat-tree. For example, when the first node is a spine node in a Spine-leaf architecture, a node that the link state data can not pass through comprises a spine node other than the first node in the leaf-spine architecture. For another example, when the first node is a leaf node in a leaf-spine architecture, a node through which the link state data can not pass through comprises other leaf nodes at a same layer as the first node. By this scheme, the redundancy can be further reduced and the convergence speed can be improved. It should be noted that the first record information in the packet sent by the first node to each neighboring node may be the same or different. For example, first record information in a packet sent by the first node to one of the neighboring nodes comprises indication information of the first node and all the neighboring nodes, and first record information in a packet sent by the first node to another neighboring node includes indication information of the first node, all the neighboring nodes, and nodes that are configured according to a preset policy and have not passed through link state data.

In an embodiment, the above technical solutions are able to be implemented in combination with a BIER. The first packet is a BIER packet, and the first record information is carried by using a bit string in a packet header of the BIER. Each node enables the BIER capability.

In an embodiment, a reserved field in the BIER packet is set to a first preset value, which indicates that a bit string in a packet header of the BIER packet carries the first record information.

In one embodiment, the Proto field in the BIER packet is set to a second preset value or a third preset value, which indicates that the payload type carried in the BIER packet is link state data.

In one embodiment, the method further comprises periodically synchronizing a link state database between the node and its neighboring nodes. There are various synchronization methods, which enable a link state database synchronization function, such as a traditional link state database synchronization mechanism. Tranditionally, this synchronization mechanism is generally only enabled on a broadcast link. In an embodiment of the present disclosure, no matter whether the synchronization mechanism is connected to a neighbour through a point-to-point link or a broadcast link, the synchronization mechanism needs to be enabled to ensure consistency of data. Alternatively, it is prescribed that as long as a node supports the flooding optimization capability, no matter whether the node is connected to a neighbour through a point-to-point link or a broadcast link, the node needs to be started to ensure data consistency.

The implementation of implementing the flooding optimization based on the BIER is further described below through specific embodiments.

The following technical solution is adopted:

1) On each node in the IGP area/level, the BIER capability is enabled, and a unique BFR-id of the whole network is configured respectively. The IGP area/level refers to an area constituted by some nodes and links connecting these nodes, and these nodes run the same IGP protocol, such as ISIS or OSPF, and notify each other of the area/level information joined by the node itself and the local link to constitute a three-layer routing network topology, such as ISIS level-2, ISIS level-1, OSPF area. In the subsequent description herein, the term "network" is sometimes used directly instead of "IGP area/level" for convenience of description.

2) Introduction of a "BIER record" function in the BIER forwarding mechanism in the related art, wherein the "BIER record" function can record which nodes the payload encapsulated by the BIER has passed through, i.e. the BitString in the BIER header records information of all nodes the payload has passed through. The payload herein refers to IGP link state data, such as an LSP (Link State PDU) packet of the ISIS or an LSU (Link State Update) packet of the OSPF. In order to meet the above functional requirements, a small amount of extension needs to be made to the RFC8296 to meet the requirements of the embodiments of the present disclosure. A specific extension may be as follows:

A newly added R (Record) flag: the Rsv field in the current BIER header is not used, and the lowest bit thereof can be used as an R flag for indicating whether the BIER packet is a BIER packet carrying record information or a traditional BIER packet. For example, when the R flag is set to 1, it indicates that the BIER packet is not a traditional BIER packet, and the traditional BIER packet forwarding processing is not performed, and the packet carries record information, and at this time, a TTL (Time to Live) in the BIER header needs to be set to 1 at the same time; when the R flag is set to 0, it indicates that the BIER packet is a conventional normal BIER packet, and its forwarding logic follows the existing RFC8296. It should be noted that, this is only an example, and the R flag may also be set to another value. In addition, the R flag may use other fields, or use other bits of the Rsv field.

Extended Proto field: the Proto field in the current BIER header does not support taking the IGP protocol packet as a load; IANA (Internet Assigned Numbers Authority) has allocated 1~6, 7~62 for the Proto field to be allocated. In the embodiment of the present disclosure, two packets representing ISIS LSP packets and two packets representing OSPF LSU packets are selected from 7 to 62. For example, in an embodiment, 7 represents ISIS LSP packets, and 8 represents OSPF LSU packets. It should be noted that, in other embodiments, other values may also be used for indication, for example, the same value indicates that the IGP protocol packet is used as a load, for example, 7 indicates that the IGP protocol packet is used as a load, where the IGP protocol packet may be an ISIS LSP packet or an OSPF LSU packet.

3) On each node in the IGP area/level, a permission "optimize redundant flooding through BER" switch (namely, an implementation of the foregoing flooding optimization switch) is configured under a corresponding IGP instance for constructing the IGP area/level, and in node capability information of the flooding, a flag (or B flag for short) indicating whether the present node supports "optimize redundant flooding through BER" is included to indicate whether the node supports redundant flooding through BER optimization. In an embodiment, the IS-IS Router Capability TLV-242 (referring to RFC7981, taking one bit from the Reserved part of the Flags field in IS-IS Router CAPABILITY TLV (routing capability type length value) for the B flag) and the Router Information Opaque LSA (referring to RFC7770, a bit is extracted from the Unassigned part of the Informational Capabilities field in the OSPF Router Informational Capabilities TLV for the B flag) may be extended, and the B flag may be newly added, for example. The B flag is set to 1, which means that the node of the capability advertiser supports "optimizing redundant flooding through BIER", which means that the node supports identification and processing of the "BIER record" packet. And identifying that the payload type of the BIER encapsulation is the aforementioned ISIS LSP packet or OSPF LSU packet, and setting the B flag to 0 indicates that the capability advertiser node does not support "optimizing redundant flooding through BIER". It should be noted that the B flag may also be set to another value to indicate whether "optimize redundant flooding through BER" is supported. It should be noted that, in other embodiments, the "optimize redundant flooding through BER" switch may also not be configured, and all nodes are defaulted to support the "optimize redundant flooding through BER" capability.

4) On the basis of the described basis, when a certain node A in the network needs to flood locally generated link state data to a certain neighbor node N, if the node A supports "optimizing redundant flooding through BIER", and the node A senses that the neighbor node N also has the "optimizing redundant flooding through BIER" capability, the node A may flood the link state data to the neighbor through the "BIER record" packet, and at this time, the BitString in the "BIER record" packet (in order to avoid confusion, the BitString in the BIER header in the sent "BIER record" packet is recorded as send_bitstring in this text) comprises the BFR-id information of the node itself and all the neighbor nodes thereof, and the encapsulated load is the described link state data (such as ISIS LSP or OSPF LSU). It should be noted that when there are a plurality of links between the node A and the neighboring nodes N, it is only required to select one of the links to send the "BIER record" packet, and it is not allowed to send the packet along each link.

If node A does not support "optimize redundant flooding through BER", or perceives that neighboring nodes N do not have the "optimize redundant flooding through BER" capability, node A floods link state data to nodes N by using a traditional IGP flooding mechanism.

In practical network deployments, if an administrator determines that all nodes in a network have a capability of "optimizing redundant flooding through a BIER", a local policy may be configured on each node to forcibly flood link state data to at least one neighboring nodes by using a "BIER record" packet, so as to accelerate convergence (for example, creating a dense network).

5) Further, a node A in the network may receive, from a certain neighboring node N in the network, link state data (or referred to as remote link state data) generated non-locally, which may be received through a traditional IGP flooding mechanism, and may also be received through a "BIER record" packet (in order to avoid confusion, the BitString in the BIER header in the received "BIER record" packet is recorded as recv_bitstring in this specification). The following cases are described:

a) Received via a "BIER record" packet: after node A receives the packet, node A needs to check whether the same remote link state data already exists in the locally maintained link state database, and whether the "BIER record" packet is older than the same remote link state data. If the local node does not exist the same remote link state data locally or the local node exists the same remote link state data locally and the same remote link state data is old, the node A needs to add or update the received remote link state data to a locally maintained link state database, and then continues to flood the received remote link state data to all other neighbor nodes except the node N and all the neighbor nodes included in the recv_bitstring; if the local link state database is new, the node A only needs to flood local new link state data to the neighboring node N; if a received update is the same as that maintained locally, no processing is performed.

b) After receiving the data by using the traditional IGP flooding mechanism: Node A needs to check whether the same remote link state data already exists in the locally, whether the "BIER record" packet is older than the same remote link state data. If the locally existing state or the locally existing state is old, the node A needs to add or update the received remote link state data to a locally maintained link state database, and then continues to flood the data to all other neighbors except the node N; if the local link state database is new, the node A only needs to flood local new link state data to the neighboring node N; if a received update is the same as that maintained locally, no processing is performed.

In the above two cases, if the node A needs to flood the remote link state data to any neighbour flooding, as in step 4), it needs to decide whether to adopt a traditional IGP flooding mechanism or to send a corresponding "BIER record" packet according to whether the local node and the neighbour node support the "optimizing redundant flooding through BIER" capability (note that configuring a local policy can forcibly adopt a "BIER record" packet). If a corresponding "BIER record" packet is sent, the send bitstring contains the BFR-id information of the node A itself and the BFR-id information of all the neighbors of the node A. Especially, when this behavior is caused by the far-end link state data received by the node A from the neighbors node N through the "BIER record" packet, the BitString (namely, send_bitstring) also contains the BFR-id information already contained in the recv_bitstring of the "BIER record" packet received from the neighbors node N.

6) Further, a local policy may be configured, so that when the link state data is flooded to the neighbor by using the "BIER record" packet, some BFR-id information is added to the BitString in the BIER header explicitly according to the local policy, and the BFR-id may not be an actual IGP neighbor. In some network topologies with significant features, such as Spine-leaf, this local policy will work well to reduce redundant flooding. It should be noted that, the solution is not limited to the Spine-leaf network, and may also be used in other networks, for example, CLOS and Fat-tree networks.

7) In the above steps, when determining whether to flood link state data to a neighbor, each node filters some neighbors according to the recv_bitstring. In some extreme events with a very small occurrence probability, the filtered neighbors may not receive the corresponding link state data exactly before, and may will never receive the link state data again. Therefore, an error correction mechanism is introduced to prevent this situation. This can ensure data consistency by still using a traditional link state database synchronization mechanism between each node and a neighbouring node in a network. For example, an OSPF DDP (Database Description Packet) or an ISIS CSNP (Complete Sequence Numbers PDU) contains abstract information about the whole link state database. The traditional synchronization mechanism is generally only enabled on a broadcast link. In one embodiment of the present disclosure, it is appointed that as long as a node supports a "optimized redundant flooding by BIER" capability, no matter whether the node is connected to a neighbour via a point-to-point link or a broadcast link, the node needs to be enabled to ensure data consistency. For a broadcast link, an existing OSPF or ISIS protocol defines a set of rules for electing a DR (Designated Router) or a DIS (Designated Intermediate-System), and the DR or DIS is responsible for sending abstract information (such as an OSPF DDP or an ISIS CSNP) about the whole link state database thereof, and other nodes, after receiving same, perform comparison with locally maintained link state data, recognize which link state data DR or DIS has (or is new) and has no (or is old) and has no (or is old) or DR or DIS has (or is old) and has a local (or is new), and these recognized link state data will be flooded on the broadcast link, which is the same as the processing in step 4), the flooding sender node needs to decide whether to adopt a traditional IGP flooding mechanism or send a corresponding "BIER record" packet according to whether the local node and the neighboring node support the "optimizing redundant flooding through BIER" capability (note that the local policy can forcibly adopt the "BIER record" packet), which is not described herein again; for a point-to-point link, reference may be made to the DR or DIS election rule on a broadcast link, and an end node with a high priority is elected to be responsible for sending digest information of the whole link state database of the end node, and other processing is the same as that of the broadcast link.

8) In the above process, the BitString of the BIER header is used to record the indication information of the nodes that the link state data has passed through, therefore, the BIER function needs to be deployed in the network. In fact, based on similar ideas, it is also feasible to directly use a carrier header (such as an Ethernet header and an IP header) of a traditional IGP protocol packet to perform appropriate extension, and introduce a field similar to BitString to record indication information of a node that the link state data passes through, and the processing idea is the same as the above.

By means of the method of the embodiments of the present disclosure, compared with the related art, the phenomenon of redundant flooding of link state data in a network will be significantly reduced, the implementation is extremely simple, the cost is very small, and there are obvious advantages compared with other optimization means.

Specific Example 1

Figure 2:
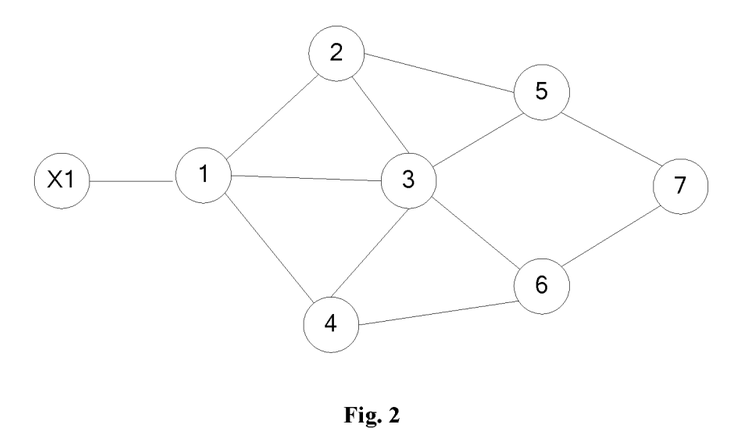
FIG. 2 is a network topology diagram of the first and second embodiments of the present disclosure.

The network shown in FIG. 2 is a sparse network. It is assumed that the network runs an ISIS protocol and enables a BIER function. All nodes in the network are located in an ISIS level 2, and support a "redundancy flooding optimization by BIER" capability. The network is firstly composed of nodes 1-7 and corresponding links, and after the network is stable, a node X1 and a link connecting the network are newly added to the network, and next, a flooding process of link state data in the network caused by this event is observed. It is assumed that the BFR-id of each node is the node number of the node, for example, the BFR-id of node 1 is 1. The details are as follows:

Step 301, after an ISIS neighbor relationship is established between a node 1 and a node X1, the node 1 generates local link state data, i.e. a unidirectional link pointing from the node 1 to the node X1, and is recorded as an LSP (1→X1). By the same reasoning, the node X1 also generates local link state data, i.e. a unidirectional link pointing from the node X1 to the node 1, and is recorded as an LSP (X1→1).

Step 302, node 1 floods locally generated link state data LSP (1→X1) to all its neighbors. Since node 1 knows that all nodes in a network have a capability of "optimizing redundant flooding through BIER", node 1 may flood a packet through a "BIER record" (or forcefully use a "BIER record" packet flooding according to a configured local policy). At this time, node 1 respectively floods BIR ids X1, 1, 2, 3 and 4 into a BIER header in a "BIER record" packet flooded by each neighbor (X1, 2, 3 and 4), and a load encapsulated by the BIER is denoted as the link state data LSP (1→X1).

Step 303, node 2 receives the described "BIER record" packet, analysis the packet to obtain the link state data LSP (1→X1), adds the link state data LSP to a link state database maintained locally, and then continues to flood the link state data LSP to other neighbors. Since the recv-bitstring of the described "BIER record" packet received contains BFR ids X1, 1, 2, 3 and 4, that is, a BFR-id of the neighboring node 3 is already included, hence, node 2 only needs to flood the neighboring node 5. The node 2 knows that all nodes in the network have the capability of optimizing redundant flooding through the BIER, and may flood a packet through a "BIER record" (or forcibly flood a packet by using a "BIER record" according to a configured local policy). In this case, the "BIER record" packet flooded by the node 2 to the neighboring node 5 includes the payloads encapsulated by the BFR id X1, 1, 2, 3, 4, 5, and 5, and the BIER as the link state data LSP (1→X1).

Similarly, after node 3 receives the "BIER record" packet from node 1 and performs local processing, node 3 may further flood the "BIER record" packet to neighboring nodes 5 and 6 respectively, and the corresponding send-standing includes BFR ids X1, 1, 2, 3, 4, 5, and 6.

Similarly, after node 4 receives the "BIER record" packet from node 1 and performs local processing, node 4 may also continue to flood the "BIER record" packet to neighboring node 6, and the corresponding send-bitstring includes BFR ids X1, 1, 2, 3, 4, and 6.

Step 304, node 5 receives the corresponding link state data flooding from nodes 2 and 3 respectively, and assuming that node 2 receives flooding first, since the corresponding recv-bitstring contains BFR ids X1, 1, 2, 3, 4 and 5, node 5 needs to continue to flood a "BIER record" packet to neighboring node 7 after local processing, and the corresponding send-bitstring contains BFR ids X1, 1, 2, 3, 4, 5 and 7. Next, node 5 processes the link state data flooding received from node 3, and since the same new link state data LSP (1→X1) already exists locally, no processing is performed.

Similarly, node 6 may also receive corresponding link state data flooding from nodes 3 and 4 respectively, and after local processing, node 6 may continue to flood the corresponding link state data to neighboring node 7 through a "BIER record" packet, and the corresponding send-bitstring includes BFR ids X1, 1, 2, 3, 4, 6, and 7.

Step 305, node 7 receives the corresponding link state data flooding from nodes 5 and 6 respectively, and assuming that the flooding is received from node 5 first, since the corresponding recv-bitstring contains BFR ids X1, 1, 2, 3, 4, 5, and 7, node 7 needs to continue to flood a "BIER record" packet to neighboring node 6 after local processing, and the corresponding send-bitstring contains BFR ids X1, 1, 2, 3, 4, 5, 6, and 7; and after receiving the packet, the neighboring node 6 does not perform processing since the same new link state data LSP (1→X1) already exists locally. Next, node 7 processes the link state data flooding received from node 6, and because the same new link state data LSP (1→X1) already exists locally, no processing is performed.

Step 306, similarly, the node X1 also floods the neighboring node 1 with the link state data LSP (X1→1) through the "BIER record" packet, the BitString in the BIER header includes BFR ids X1 and 1, and after the node 1 receives the remote link state data, the subsequent flooding process is the same as the above flooding local link-like-body data LSP (1→X1), which will not be repeated.

It can be seen from this embodiment that, the solution provided in this embodiment has certain optimization to the redundant flooding of the sparse network, and reduces unnecessary redundant flooding in part.

Specific Example 2

This example is based on the first embodiment, and describes a problem in which inconsistency of link state data may occur between neighbors in a network in an extreme case and a corresponding correction mechanism. Still as shown in FIG. 2, assuming that when node 1 floods locally generated link state data LSP (1→X1) to all its neighbors X1, 2, 3, and 4 through a "BIER record" packet, the link between node 1 and neighbor node 2 is disconnected suddenly, the ISIS neighbor relationship between node 1 and node 2 is deleted, and node 1 cannot flood the link state data LSP (1→X1) to node 2. The "BIER record" packet is only received by nodes X1, 3, and 4. On node 3, because the received "BIER record" packet contains the BFR-ids X1, 1, 2, 3, and 4 in its recv-bitstring, node 3 also does not flood the corresponding link state data LSP (1→X1) to node 2, and therefore node 2 cannot receive the link state data LSP (1→X1) at any time.

In order to solve this problem, one end node (for example, node 2) with a high priority between node 2 and node 3 may be elected to periodically send its CSNP to another end node (for example, node 3). Here, after receiving the CSNP sent by node 2, node 3 compares same with a link state database locally maintained thereby, and finds that the locally existing link state data LSP (1→X1) is absent in node 2, and then node 3 sends the described link state data LSP (1→X1) to node 2 via a "BIER record" packet, the send-bitstring of which contains BFR-id 1, 2, 3, 4, 5 and 6; after receiving the packet, node 2 adds the LSP (1→X1) to the link state database locally maintained thereby, and does not further flood neighbour 1 and 5 thereof, because the recv-bitstring of the received "BIER record" packet contains BFR-id 1, 2, 3, 4, 5 and 6.

Specific Example 3

Figure 3:
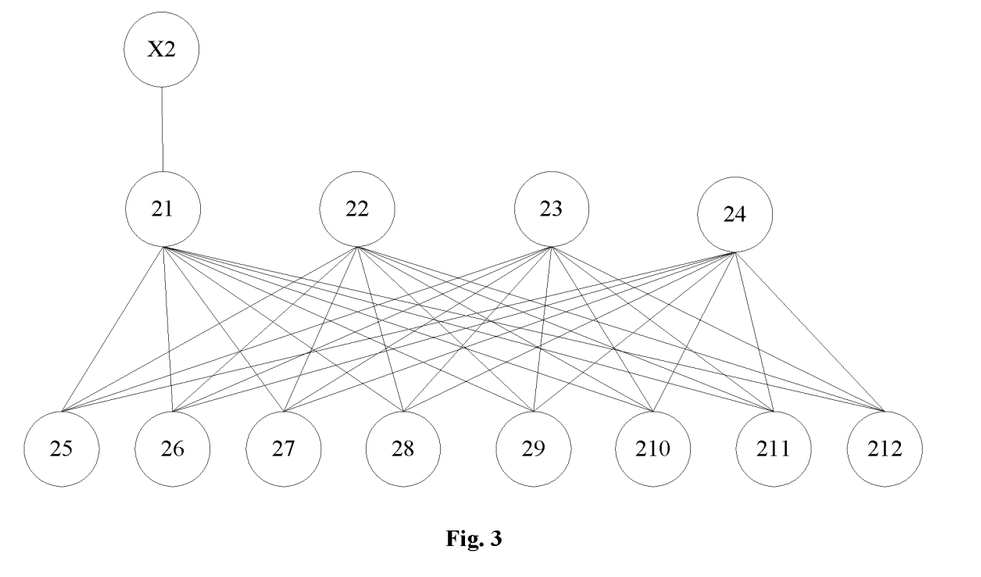
FIG. 3 is a network topology of a third embodiment of the present disclosure.

This embodiment verifies the optimization effect of the technical solution of the present disclosure in a typical Spine-leaf architecture of a data center network. As shown in FIG. 3, the solution is a K(4,8) topology, comprising four Spines and eight Leafs, and all Spine nodes are connected to all Leaf nodes. Assuming that the OSPF protocol runs in the network and the BIER function is enabled, all nodes in the network are in the same OSPF area, and support the "optimize redundant flooding through the BIER" capability. The network is firstly composed of nodes 21-29 and nodes 210-212 and corresponding links, and after the network is stable, a node X2 and a link connecting the network are newly added into the network, and then a flooding process of link state data in the network caused by the observation of the event is performed. It is assumed that the BFR-id of each node is the node number thereof, for example, the BFR-id of node 21 is 21. The details are as follows:

Step 401, after an OSPF neighbor relationship is established between a node 21 and a node X2, the node 21 will generate a local link state data, i.e. a unidirectional link from the node 21 to the node X2, which is denoted as LSA (21→X2), and by the same reasoning, the node X2 will also generate a local link state data, i.e. a unidirectional link from the node X2 to the node 21, which is denoted as LSA (X2→21).

Step 402, node 21 floods locally generated link state data LSA (21→X2) to all its neighbors, and since node 21 knows that all nodes in the network have the capability of "optimizing redundant flooding through BIER", the packet can be flooded through a "BIER record" packet (or forcefully using a "BIER record" packet according to a configured local policy); in addition, a local policy is configured on the node 21, and the policy allows the BFR-ids of all other Spine nodes 22, 23 and 24 that also serve as Spine roles to be added to the send-bitstring of the "BIER record" packet flooded externally by the node 21. Although no OSPF neighbor relationship is established between the other Spine nodes 22, 23 and 24 and the node 21, such a local policy controls the "BIER record" packet flooded to most of the Leaf side neighbor nodes (such as the nodes 26~212) to be added additionally with the BFR-id information of the other Spine nodes 22, 23 and 24 to the send-bitstring of the "BIER record" packet flooded only to very few Leaf side neighbor nodes (such as the only single node 25) without adding the BFR-id information of the other Spine nodes 22, 23 and 24 to the send-bitstring of the "BIER record" packet.

Therefore, when node 21 respectively floods a "BIER record" packet to each of the neighbors (X2, 25, 26, 27, 28, 29, 210, 211, 212), the "BIER record" packet flooded to node 25 has a send-bit string containing BFR id X2, 21, 25, 26, 27, 28, 29, 210, 211, 212, and the "BIER record" packet flooded to nodes 26~212 have send-bit string containing BFR id X2, 21, 22, 23, 24, 25, 26, 27, 28, 29, 210, 211, 212, and the loads encapsulated by the BIER are recorded as the link state data LSA (21→X2).

Step 403, node 25 receives the "BIER record" packet, analysis the packet to obtain the link state data LSA (21→X2), adds the LSA to a link state database maintained locally, and then continues to flood the LSA to other neighbors. Since the corresponding recv-bitstring contains BFR ids X2, 21, 25, 26, 27, 28, 29, 210, 211, 212, node 25 needs to flood neighbor nodes 22, 23, 24. In this case, the send-bitstring of the "BIER record" packet flooded by node 25 to the neighboring nodes 22, 23, and 24 includes the BFR ids X2, 21, 22, 23, 24, 25, 26, 27, 28, 29, 210, 211, and 212, and the payload encapsulated by the BIER is recorded as the link state data LSA (21→X2).

Similarly, node 26 also receives a corresponding "BIER record" packet from node 21, analysis the packet to obtain link state data LSA (21→X2), and adds the LSA to a link state database maintained locally. Since the received "BIER record" packet contains the BFR id X2, 21, 22, 23, 24, 25, 26, 27, 28, 29, 210, 211, 212 in its recv-bitstring, the LSA (21→X2) will not be flooded to the neighbour 22, 23, 24. The processing of nodes 27, 28, 29, 210, 211, 212 is similar to that of node 26.

Step 404, after receiving flooding of the link state data LSA (21→X2) from node 25, node 22 analysis the flooding to obtain link state data LSA (21→X2), and adds the link state data LSA (21→X2) to a link state database maintained locally. Since the received "BIER record" packet contains the BFR ids X2, 21, 22, 23, 24, 25, 26, 27, 28, 29, 210, 211, 212 in its recv-bitstring, the described link state data LSA (21→X2) will not be flooded to the neighbouring nodes 25-212. The processing of nodes 23, 24 is similar to that of node 22.

Step 405, similarly, the node X2 also floods link state data LSA (X2→21) to the neighboring node 21 through a "BIER record" packet, the corresponding send-bitstring contains BFR id X2 and 21, and after the node 21 receives the remote link state data, the subsequent flooding process is the same as the described flooding local link body data LSA (21→X2), and will not be repeated.

The solution provided in this embodiment, compared with an implementation in which Spine nodes 22, 23, and 24 are not added to record information, can prevent neighboring nodes 26, 27, 28, 29, 210, 211, and 212 from sending a packet carrying link state data to Spine nodes 22, 23, and 24, reduce redundant flooding, and improve convergence speed. The solution provided in this embodiment significantly optimizes redundant flooding of a dense network of a Spine-leaf type, and reduces redundant flooding that is mostly unnecessary.

Specific Example 4

Figure 4:
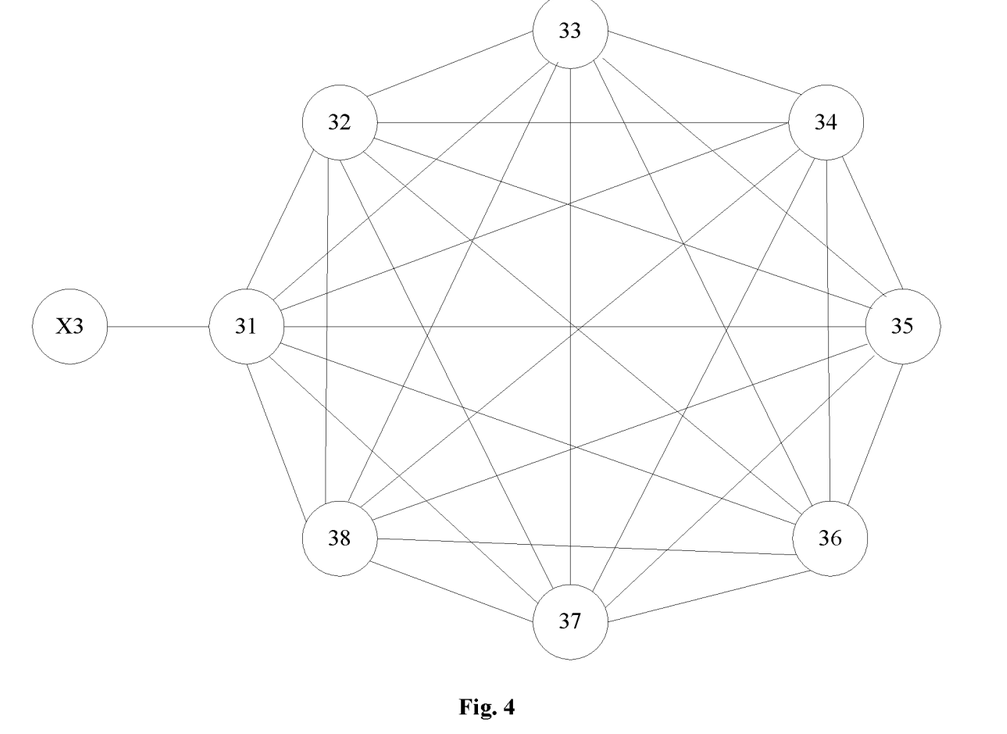
FIG. 4 is a network topology diagram according to a fourth embodiment of the present disclosure.

This embodiment verifies the optimization effect of the present disclosure in a full full-mesh network. As shown in FIG. 4, the full-mesh topology is a full-mesh topology including eight nodes, and each node is directly connected to all other nodes. Assuming that the OSPF protocol runs in the network and the BIER function is enabled, all nodes in the network are in the same OSPF area, and both support the "optimize redundant flooding through BIER' capability, and assuming that the BFR-id of each node is the node number thereof, for example, the BFR-id of node 31 is 31. The network is firstly composed of nodes 31-38 and corresponding links, and after the network is stabilized, the node X3 and the link connected to the network are added to the network. The flooding process of the link state data caused by this event in the network is completely similar to the foregoing embodiment. However, in this example, we will observe a very extreme phenomenon, that is, the link state data only needs to be flooded once. There is no phenomenon that neighbors continue to flood. For example, when node 31 floods locally generated link state data LSA (31→X3) to all its neighboring nodes X3, 32, 33, 34, 35, 36, 37 and 38 through a "BIER record" packet, the corresponding send-bitstring contains BFR id X3, 31, 32, 33, 34, 35, 36, 37 and 38, and after receiving the described "BIER record" packet, each neighboring node merely parses the link state data LSA (31→X3) therefrom, and adds same to a local link state maintenance database, without continuing to flood respective neighboring nodes. The specific process is not described herein again.

It can be seen from this embodiment that, in the solution provided in this embodiment, the optimization effect of the redundant flooding of the dense network of the full-mesh is the best, and any unnecessary redundant flooding is completely reduced.

Figure 5:
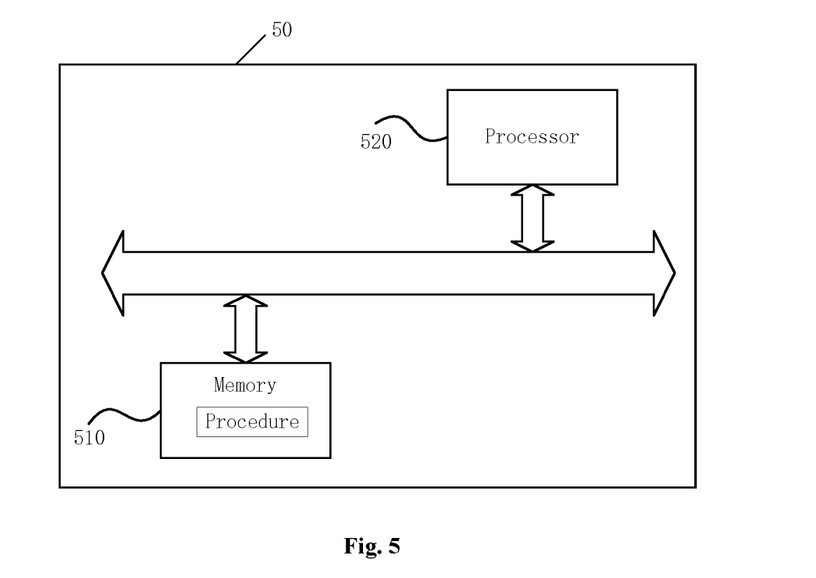
FIG. 5 is a block diagram of an internal gateway protocol flooding optimization device according to an embodiment of the present disclosure.

As shown in FIG. 5, an embodiment of the present disclosure provides an internal gateway protocol flooding optimization device 50, comprising a memory 510 and a processor 520, wherein the memory 510 stores a program, and when the program is read and executed by the processor 520, the internal gateway protocol flooding optimization method of any embodiment is implemented.

Figure 6:
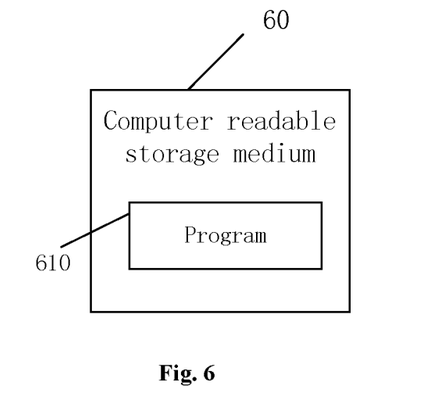
FIG. 6 is a block diagram of a computer readable storage medium according to an embodiment of the present disclosure.

As shown in FIG. 6, an embodiment of the present disclosure provides a computer readable storage medium 60. The computer readable storage medium stores one or more programs 610. The one or more programs may be executed by one or more processors, so as to implement the method for optimizing flooding an internal gateway protocol according to any embodiment.

Those of ordinary skill in the art can appreciate that the functional blocks/units in all or some of the steps, systems, and devices of the methods disclosed above can be implemented as software, firmware, hardware, and any suitable combination thereof. In a hardware implementation, the division between functional modules/units referred to in the above description does not necessarily correspond to the division of physical components; for example, one physical component may have multiple functions, or one function or step may be cooperatively performed by several physical components. Some or all components may be implemented as software executed by a processor, such as a digital signal processor or microprocessor, or as hardware, or as an integrated circuit, such as an disclosure specific integrated circuit. Such software may be distributed on computer-readable media, which may include computer storage media (or non-transitory media) and communication media (or transitory media). As is well known to those of ordinary skill in the art, the term computer storage media includes both volatile and nonvolatile, removable and non-removable media implemented in any method or technology for storage of information (such as computer readable instructions, data structures, program modules, or other data). Computer storage media includes, but is not limited to, RAM, ROM, EEPROM, flash memory or other memory technology, CD-ROM, digital versatile discs (DVD) or other optical disk storage, magnetic cassettes, magnetic tape, magnetic disk storage or other magnetic storage devices, or any other medium which can be used to store the desired information and which can be accessed by a computer. In addition, communication media typically embodies computer readable instructions, data structures, program modules, or other data in a modulated data signal such as a carrier wave or other transport mechanism and may include any information delivery media as is known to those of ordinary skill in the art.

INDUSTRIAL APPLICABILITY

An embodiment of the present disclosure provides a method for optimizing flooding of an internal gateway protocol. flooding, by a first node, a first packet carrying link state data and first record information to at least one neighboring node, wherein the first record information comprises indication information of nodes that the link state data has passed through. By means of the method of the embodiments of the present disclosure, by carrying indication information about a node that link state data passes through, it is convenient for the node to reduce redundant sending of the link state information according to the information, thereby accelerating convergence speed, achieving extremely simple implementation and very small costs, and having obvious advantages compared with other optimization means.

The invention claimed is:

1. A method for optimizing flooding of an internal gateway protocol, comprising:
flooding, by a first node, a first packet carrying link state data and first record information to at least one neighboring node, wherein the first record information comprises indication information of nodes that the link state data has passed through;
wherein flooding by a first node a first packet carrying link state data and first record information to at least one neighboring node comprises:
flooding by the first node the first packet to a neighboring node other than the second node and nodes indicated by a second record information wherein the first record information comprises an identifier of the first node identifiers of all neighboring nodes of the first node and the second record information wherein the second record information is carried in a second packet from the second node.

2. The method for optimizing flooding of an internal gateway protocol according to claim 1, wherein flooding, by a first node, a first packet carrying link state data and first record information to at least one neighboring node comprises:
when the first node locally generates the link state data, flooding, by the first node, the first packet to the at least one neighboring node, wherein the first record information comprises an identifier of the first node and identifiers of all neighboring nodes of the first node.

3. The method for optimizing flooding of an internal gateway protocol according to claim 1, wherein the first record information further comprises indication information of nodes that the link state data has not passed through, wherein the nodes that the link state data has not passed through are configured according to a preset policy.

4. The method for optimizing flooding of an internal gateway protocol according to claim 3, wherein when the first node is a node in a hierarchical network structure, the nodes that the link state data has not passed through comprise other nodes at a same layer as the first node, wherein the hierarchical network structure comprises multiple layers of nodes, nodes within a same layer are not connected with each other or are only partially connected, and the node is fully connected to nodes at a next layer.

5. The method for optimizing flooding of an internal gateway protocol according to claim 1, wherein flooding, by the first node, the first packet carrying link state data and first record information to a neighboring node comprises:
when the first node supports a preset flooding optimization capability, flooding, by the first node, the first packet to a neighboring node that supports the preset flooding optimization capability.

6. The method for optimizing flooding of an internal gateway protocol according to claim 1, wherein the first packet is a bit indexed explicit replication packet, and the first record information is carried using a bit string in a packet header of the bit indexed explicit replication packet.

7. The method for optimizing flooding of an internal gateway protocol according to claim 6, wherein a reserved field in the bit indexed explicit replication packet is set to a first preset value indicating that the bit string in the packet header of the bit indexed explicit replication packet carries the first record information.

8. The method for optimizing flooding of an internal gateway protocol according to claim 6, wherein a Proto field in the bit indexed explicit replication packet is set to a second preset value or a third preset value indicating that a type of a payload carried in the bit indexed explicit replication packet is the link state data.

9. The method for optimizing flooding of an internal gateway protocol according to claim 1, wherein the method further comprises:
periodically synchronizing, by the first node or the second node, the link state database with the neighboring node of the node.

10. The method for optimizing flooding of an internal gateway protocol according to claim 2, wherein the method further comprises:
periodically synchronizing, by the first node or the second node, the link state database with the neighboring node of the node.

11. The method for optimizing flooding of an internal gateway protocol according to claim 3, wherein the method further comprises:
periodically synchronizing, by the first node or the second node, the link state database with the neighboring node of the node.

12. The method for optimizing flooding of an internal gateway protocol according to claim 4, wherein the method further comprises:
periodically synchronizing, by the first node or the second node, the link state database with the neighboring node of the node.

13. The method for optimizing flooding of an internal gateway protocol according to claim 5, wherein the method further comprises:
periodically synchronizing, by the first node or the second node, the link state database with the neighboring node of the node.

14. The method for optimizing flooding of an internal gateway protocol according to claim 13, wherein the method further comprises:
periodically synchronizing, by the first node or the second node, the link state database with the neighboring node of the node.

15. The method for optimizing flooding of an internal gateway protocol according to claim 7, wherein the method further comprises:
periodically synchronizing, by the first node or the second node, the link state database with the neighboring node of the node.

16. The method for optimizing flooding of an internal gateway protocol according to claim 8, wherein the method further comprises:
periodically synchronizing, by the first node or the second node, the link state database with the neighboring node of the node.

17. A device for optimizing flooding of an internal gateway protocol, comprising:
a memory storing instructions and a processor in communication with the memory, wherein the processor is configured to execute the instructions to implement the method for optimizing flooding of an internal gateway protocol according to claim 1.

18. A non-transitory computer readable storage medium, wherein the computer readable storage medium stores one or more programs, wherein the one or more programs are able to be executed by one or more processors, to implement the method for optimizing flooding of an internal gateway protocol according to claim 1.

* * * * *